United States Patent
Erden et al.

(10) Patent No.: US 9,928,861 B1
(45) Date of Patent: Mar. 27, 2018

(54) DETERMINING BIT ASPECT RATIOS FOR MULTIPLE, INDEPENDENT, ACTUATOR STORAGE DEVICE

(71) Applicant: Seagate Technology LLC, Cupertino, CA (US)

(72) Inventors: Mehmet Fatih Erden, St. Louis Park, MN (US); Mark Allen Gaertner, Vadnais Heights, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 15/652,852

(22) Filed: Jul. 18, 2017

(51) Int. Cl.
*G11B 5/55* (2006.01)

(52) U.S. Cl.
CPC .......... *G11B 5/5534* (2013.01); *G11B 5/5586* (2013.01)

(58) Field of Classification Search
CPC ............ G11B 5/012; G11B 5/02; G11B 5/48–5/4826; G11B 5/4873; G11B 5/54–5/55; G11B 5/5521–5/5586; G11B 5/596–5/59627; G11B 19/04–19/041; G11B 19/045

USPC ................. 360/48, 55, 60, 69, 75, 78.05, 76
See application file for complete search history.

(56) References Cited

U.S. PATENT DOCUMENTS

| | | | |
|---|---|---|---|
| 5,761,007 A | 6/1998 | Price et al. | |
| 6,091,559 A | 7/2000 | Emo et al. | |
| 6,751,036 B2 | 6/2004 | Quak et al. | |
| 8,941,937 B1 * | 1/2015 | Toribio | G11B 5/012 360/31 |
| 9,280,987 B1 * | 3/2016 | Bao | G11B 5/5534 |
| 9,495,995 B1 * | 11/2016 | Zhu | G11B 5/02 |
| 9,691,418 B1 * | 6/2017 | Zhu | G11B 5/012 |
| 9,704,519 B1 * | 7/2017 | Zhu | G11B 5/455 |

\* cited by examiner

*Primary Examiner* — Joseph Feild
*Assistant Examiner* — James L Habermehl
(74) *Attorney, Agent, or Firm* — Hollingsworth Davis, LLC

(57) ABSTRACT

Performance data of two or more actuators of a storage device is determined. The actuators independently move respective two or more heads over one or more disks coupled to a spindle motor. The independent movement of the two or more heads causes coupling therebetween that affects tracking of the two or more heads. Based on the performance data, bit aspect ratios associated with each of the two or more heads are selected that minimize performance impacts due to the coupling.

20 Claims, 5 Drawing Sheets

DETERMINING BIT ASPECT RATIOS FOR MULTIPLE, INDEPENDENT, ACTUATOR STORAGE DEVICE

SUMMARY

The present disclosure is directed to determining bit aspect ratios for a multiple-actuator storage device. In one embodiment, performance data of two or more actuators of a storage device is determined. The actuators independently move respective two or more heads over one or more disks coupled to a spindle motor. The independent movement of the two or more heads causes coupling therebetween that affects tracking of the two or more heads. Based on the performance data, bit aspect ratios associated with each of the two or more heads are selected that minimize performance impacts due to the coupling. The selected bit-aspect ratios are used for recording user data via the two or more heads.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

The present disclosure generally relates to data storage devices that utilize magnetic storage media, e.g., hard disks. The storage capacity of hard disk drives (HDDs) have steadily increased due to the increase in areal density provided by such technological advances as perpendicular recording, shingled recording, helium filling, etc. This increase in HDD capacity, while reducing costs, can affect performance in some situations. For example, operations that require writing to large portions of the disk (such as a rebuild of a failed volume of a disk drive array) can take significant amounts of time given the increased capacity.

One way to address the need for greater HDD performance is to utilize multiple read/write heads in parallel. Such parallelism can increase the rate of input/output operations (IOPS) and thereby speed up certain operations. Use of simultaneously operating read/write heads can provide other options for a system designer instead of just increase in IOPS. For example, an HDD can be configured with zones having different levels of throughput and capacity, and multiple heads can be operated in different modes to improve throughput in some zones while improving capacity (or other performance parameter) in others.

In embodiments described below, a hard disk drive includes multiple heads driven by separate actuators that can read from or write to one or more disks simultaneously. Simultaneous active heads can be used to increase data rate or for other purposes (e.g., to increase reliability, service different requests in parallel, etc.). The multiple heads can access the same disk or different disks, and may be moved across the disk surfaces in a number of different ways. In one configuration, a two (or more) part actuator may independently rotate two arms about a common axis. In other configurations, two or more actuators may be located at different locations around the disk, independently rotating about different axes.

Designs with multiple actuators simultaneously driving multiple heads can be flexibly configured, providing many options for optimizing different design parameters. However, activating multiple actuators simultaneously leads to both mechanical and electrical coupling between the actuators. This coupling can have detrimental effects on the drive both in the factory test and in the field. Therefore, embodiments below describe features and configurations that can mitigate the effect of multi-actuator coupling in an HDD.

Figure 1:
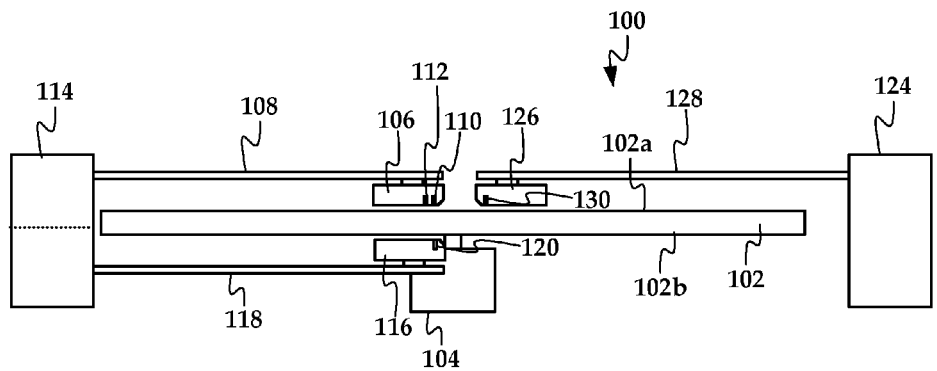
FIG. 1 is a diagram of an apparatus according to an example embodiment.

In FIG. 1, a diagram illustrates an apparatus 100 according to an example embodiment. An apparatus 100 includes at least one magnetic disk 102 driven by a spindle motor 104. A slider 106 (also referred to as a head, read/write head, read head, write head, recording head, etc.) is held over a first surface 102a of the disk 102 by an arm 108. An actuator 114 moves (e.g., rotates) the arm 108 to place the slider 106 over different tracks on the disk 102. In one embodiment, the slider includes a read transducer 110 and/or a write transducer 112. The read transducer 110 provides a signal in response to changing magnetic fields on the disk 102, and is coupled to a controller (not shown) where the separate signals are independently processed. The write transducer 112 receives signals from the controller and converts them to magnetic fields that change magnetic orientations of regions on the disk 102. In a configuration known as heat-assisted magnetic recording (HAMR) the write transducer 112 may also include an energy source (e.g., laser diode) that creates a hotspot on a part of the disk 102 currently being recorded.

The apparatus 100 includes a second slider 116 supported by a second arm 118. The second slider 116 is held over a second surface 102b of the disk 102 and actuator 114 causes the second arm 118 to move to different tracks on the disk 102. The arm 118 may move together with arm 108, or the arms 108, 118 may move independently (as indicated by dashed line on actuator 114 indicating a split actuator). In either configuration, the arms 108, 118 rotate around the same axis. The slider 116 also includes read and/or write transducers 120. The transducers 120 are capable of reading from and/or writing to disk surface 102b simultaneously with one or both of read/write transducers 110, 112 that access disk surface 102a.

In another embodiment, the apparatus 100 includes a third slider 126 supported by a third arm 128. The third slider 126 is held over the first surface 102a of the disk 102 and a second actuator 124 causes the third arm 118 to move to different tracks on the disk 102. The arm 128 and actuator 124 move independently of arm 108 and actuator 114. The slider 126 includes read and/or write transducers 130. The transducers 120 is capable of reading data from disk surface 102a simultaneously with one or both of read transducers 110, 112 of first slider 106. In this embodiment, the first slider 106 may include all or only one of the two or more read/write transducers 110, 112.

In the examples shown in FIG. 1, more than one disk 102 may be used, and the actuators 114, 124 may include heads that access some or all of the disk surfaces. Independently movable heads that utilize a split actuator 114 may generally access different surfaces, e.g., heads 106 and 116 access different surfaces 102a, 102b at the same time. Independently movable heads that utilize non-coaxial actuators 114, 124 may access the same surface at the same time, e.g., heads 106 and 126 may both access surface 102a at the same time.

Figure 2:
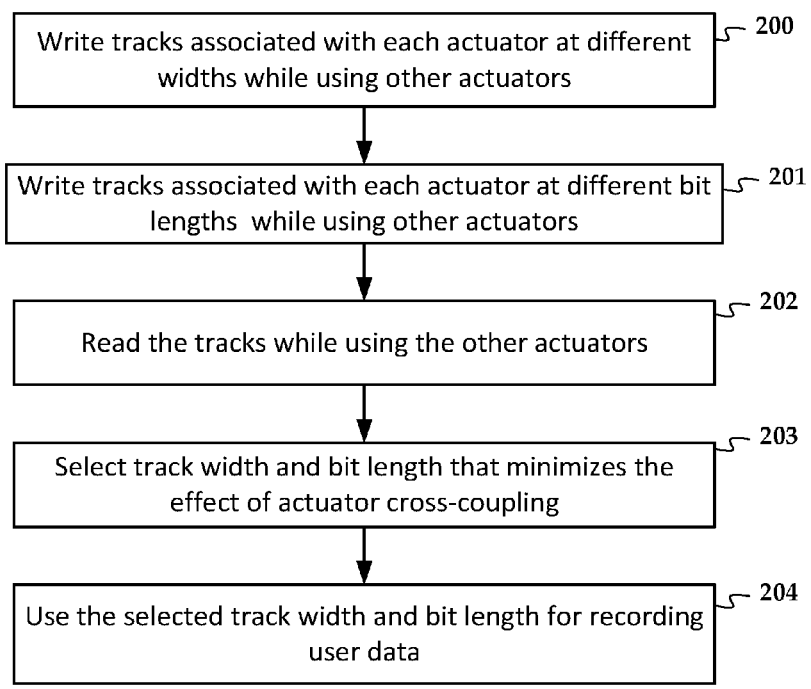
FIG. 2 is a flowchart of a procedure according to an example embodiment.

One effect that may be seen when multiple actuators are operating at once is that each head may be affected by mechanical and/or electrical coupling from other actuators that tends to cause the heads to move off track. These disturbances can be compensated for somewhat by an advanced servo control system. Even so, under otherwise similar conditions, a multi-servo system may experience more tracking errors than a single actuator system. Therefore, as described below, a multiple-actuator system may utilize wider tracks than a single-actuator system, the width of the wider tracks being determined by a procedure such as shown in the flowchart of FIG. 2.

The procedure involves writing 200 tracks associated with each actuator at a different width while using others of the actuators, e.g., random seeking, random read/write using the other actuators. Bits associated with each actuator are also written 201 at different bit lengths. These bit lengths may be dependent on a particular track width, and so writing 201 at different bit lengths may be done in combination with the writing 200 at different track widths. The written test tracks are then read back 202, and this reading 202 may also occur while the other actuators are being used.

The writing and reading 200-202 provides global characterization data that provides an understanding of the general capabilities of each actuator as a function of position (e.g., head, disc, radial position) as well as other factors, such as the environmental conditions. This allows selecting 203 a combination of track width and bit length that minimizes the effects of actuator cross-coupling. These combinations of track width and bit length may be specific to a particular actuator, disk, and or radial zone within the disk. The selected combination track of width and bit length can then be used 204 for recording user data.

Generally, electrical coupling between actuators adds noise to the system. By writing bits associated with one or more of the actuators wider, the signal energy of those bits will be adjusted accordingly in order to have the required signal-to-noise ratio (SNR) in the system. Tracks can be written wider in a number of ways. For example, in a HAMR drive, the laser power can be increased or decreased to cause a corresponding increase or decrease in track width. For shingled magnetic recording (SMR) or interlaced magnetic recording (IMR), adjacent tracks are written overlapping one another. By varying the amount of overlap, the width of the overlapped track can be adjusted. The bit length can be increased or decreased by respectively decreasing or increasing the frequency of a clock signal used to synchronize the bit transitions.

Figure 3:
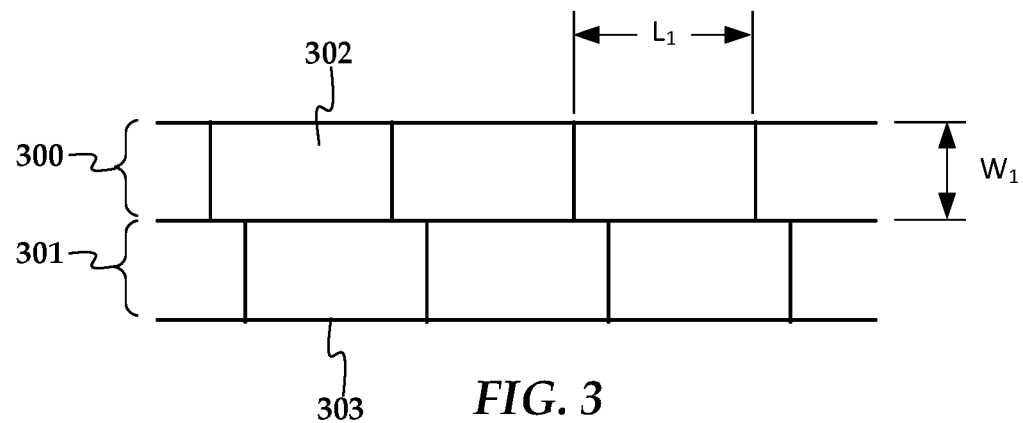
FIGS. 3 and 4 are diagrams of data tracks according to example embodiments.
Figure 4:
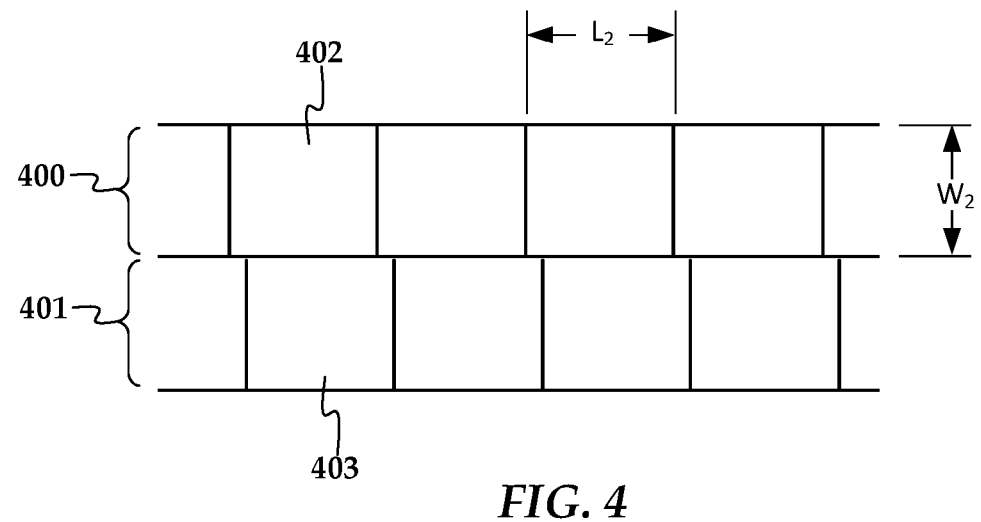

In FIGS. 3 and 4, block diagrams illustrate data tracks written with different track widths and bit lengths according to example embodiments. As seen in FIG. 3, tracks 300, 301 have a series of bits 302, 303 written along each track length. Similarly, in FIG. 4, tracks 400, 401 have a series of bits 402, 403 written along each track length. The tracks 300, 301, 400, 401 may be directly adjacent as shown (e.g., in an SMR arrangement) or be separated by guard bands (not shown).

The tracks 300, 301 have a width $W_1$ that is less than width $W_2$ of tracks 400, 401. In order to compensate for these different widths, tracks 300, 301 have a larger bit length $L_1$ than bit length $L_2$ of the tracks 400, 401. Generally, any change in bit geometry that decreases one dimension will result in an increase in another dimension to maintain adequate SNR when reading back the bits. These dimensions can be expressed as a bit aspect ratio (BAR), e.g., $BAR_1=W_1/L_1$ and $BAR_2=W_2/L_2$. Therefore, in the discussion that follows, the setting of track width and bit length to different values will be referred to as setting of variable BAR (VBAR), even though only one of track width and bit length may be varied to obtain the VBAR.

Figure 5:
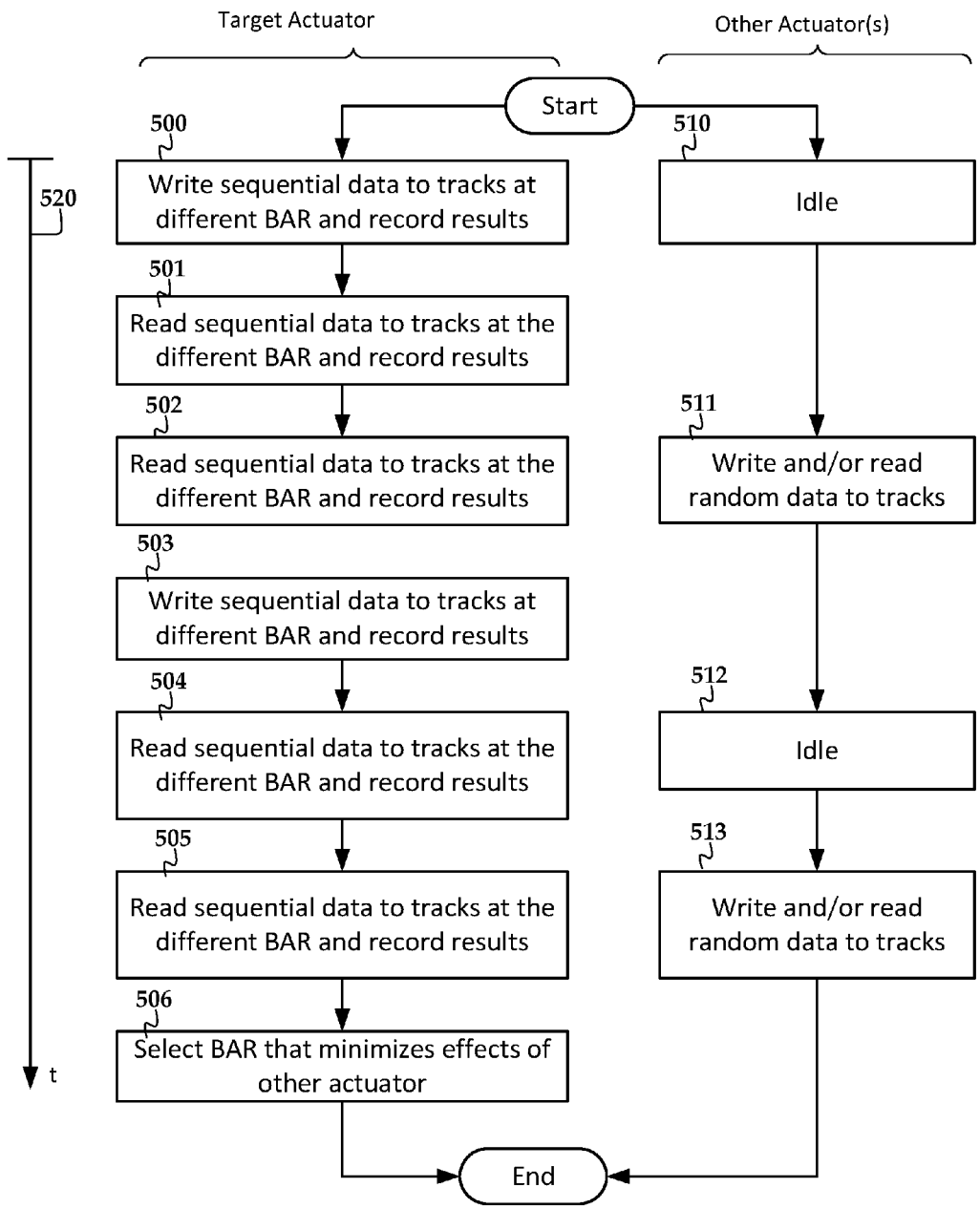
FIG. 5 is a flowchart of a procedure according to another example embodiment.

In FIG. 5, a flowchart illustrates a more detailed testing procedure of a hard disk device according to an example embodiment. The actions shown blocks 500-505 on the left side of the flowchart are carried out by a target actuator (and associated read/write heads) while the actions shown in blocks 510-513 are carried out by one or more other actuators in the device. The blocks 500-505, 510-513 are arranged by time as indicated by timeline 520. As such, vertically aligned blocks (e.g., blocks 500, 510) indicated actions that are performed in parallel at the same time intervals. The processes described by this flowchart may be executed multiple times at various radii of the disk. The processes may be run under a variety of external conditions, such as various levels of external vibration, different temperature, humidity, etc.

At the beginning of this procedure, the heads associated with the target actuator write 500 sequential data at different BAR and then read 501 the data. During these operations 500, 501, the other actuator(s) are idle 510. This provides baseline data for the rest of the procedure, and may be optional. Generally, the results recorded during the steps 500, 501 can be from a number of sources. For example, various servo performance data can be read during both reading 501 and writing 500 to determine, e.g., the amount of correction needed to maintain tracking, seek times, settling times, etc. Other data, such as bit error rate (BER) of the recorded tracks, adjacent track interference (ATI), etc., will be gathered during the reading 501 phase, as the read transducer used to gather this data will not be operational while the write transducer is active during the writing data at 500.

At block 502, the sequential data written at 500 is read again, but this time the other actuator(s) are operating 511, e.g., reading and/or writing random data. As random data may involve a greater number of seeks and other activity in a given amount of time, the performing 511 of random writes and/or reads will tend to induce a maximum level of actuator coupling to the target actuator and heads. This provides an estimate on the impact of actuator coupling on reading alone. At block 503, the sequential data is again written via the target actuator while other actuator(s) are operating 511. At block 504, the data recorded at block 503 is read back 503 and results recorded. At the same time block 504 is executing, the other actuator(s) are idled 512 so that the actuator coupling effects on writing alone can be estimated. This same data is read back at block 505, this time with the other actuators being operated 513. At block 506, the data at blocks 500-506 is gathered, and a BAR for the target actuator recording zones is selected. The BAR selected for each head may be different, and different zone-specific BAR may be used for each head.

The data gathered at blocks 500-504 can also be used for other purposes besides the determination of BAR at block 505. For example, the data gathered at blocks 500 and 501 may be used to determine a first track width of an equivalent device with a single actuator. Generally, a track width of the multi-actuator BAR selected at block 505 will have a track width that is wider than this first track width. This single-actuator equivalent data, as well as multi-actuator read-only and write-only coupling gathered at blocks 502 504 can help isolate the effects of actuator coupling compared to other sources of disturbance that might affect the results but are not caused by actuator coupling.

It will be understood that there may be many variations of the procedure shown in FIG. 5. Some operations may be optional, such as the measurement of baseline performance (e.g., blocks 500, 502, 504 performed via the target actuator and blocks 510 and 512 performed via the other actuator). In other cases, the operation of the other actuators (e.g., blocks 511, 513) may involve random access operations such as seeking and tracking without reading or writing user data (servo data may still be read during these random access operations). This procedure may be repeated using random data written via the target actuators (e.g., blocks 500-505) instead of or in addition to sequential data. The random data may be written and read either during the same operations where the sequential data is written/read, or in separate operations. Generally, any operation described above where sequential read/writes are described, random read/writes may be used instead, and vice versa. Also, the coupling between actuators may also include coupling induced by dual-stage actuators, e.g., a voice coil motor that drive an arm and microactuator that moves the head or head-gimbal assembly at the end of the arm.

Figure 6:
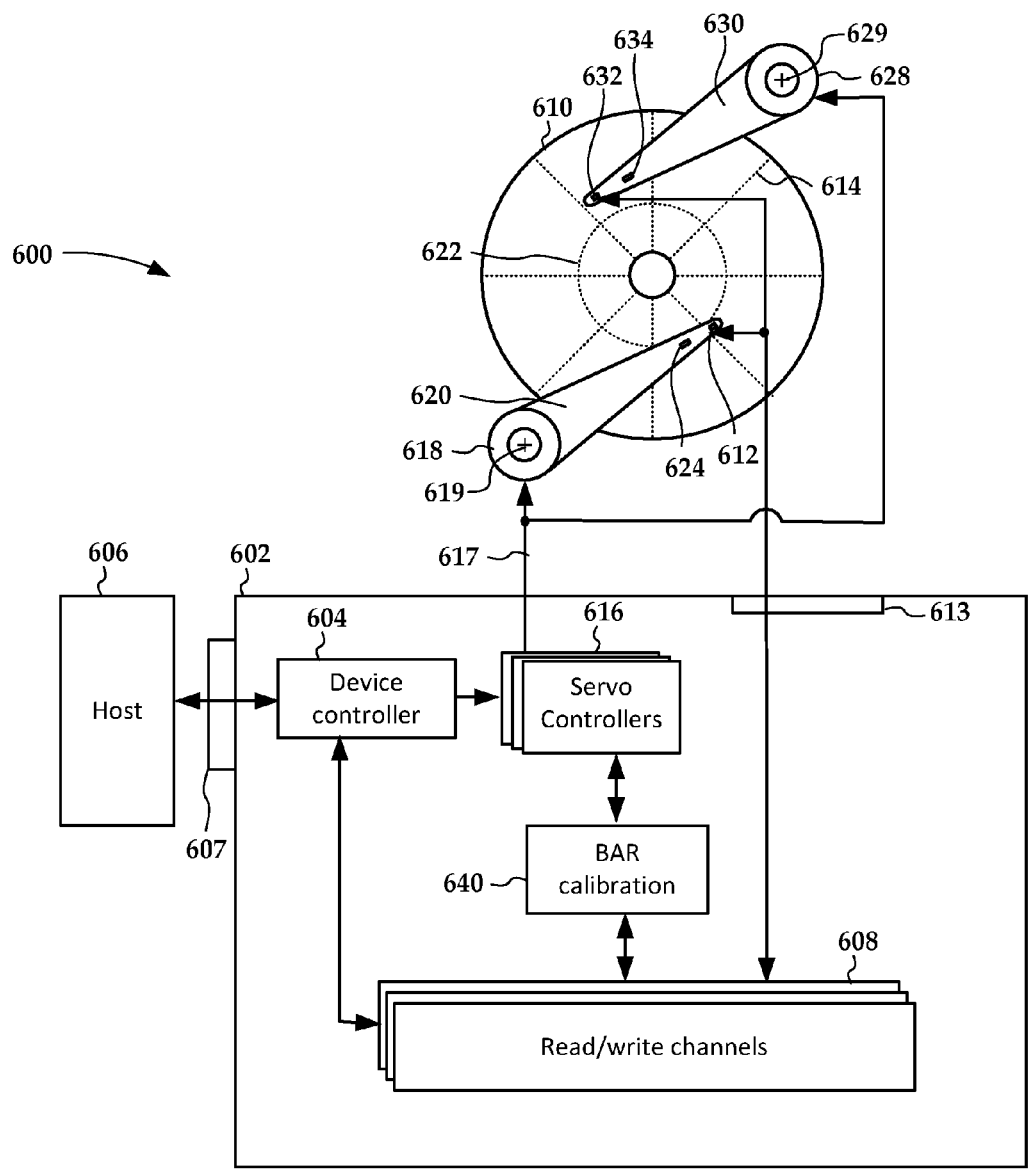
FIG. 6 is a block diagram of an apparatus according to an example embodiment.

In FIG. 6, a diagram illustrates components of a hard drive apparatus 600 that utilizes one or more read/write heads 612 according to example embodiments. The apparatus includes circuitry 602 such as a device controller 604 that processes read and write commands and associated data from a host device 606 via a host interface 607. The host interface 607 includes circuitry that enables electronic communications via standard bus protocols (e.g., SATA, SAS, PCI, etc.). The host device 606 may include any electronic device that can be communicatively coupled to store and retrieve data from a data storage device, e.g., a computer, a server, a storage controller. The device controller 604 is coupled to one or more read/write channels 608 that read from and write to surfaces of one or more magnetic disks 610.

The read/write channel 608 generally converts data between the digital signals processed by the device controller 604 and the analog signals conducted through two or more heads 612, 632 during read operations. The two or more heads 612, 632 each may include respective read transducers capable of concurrently reading the disk 610, e.g., from the same surface or different surfaces. The read transducers may be configured to read in any mode, such as conventional single-track, conventional multi-track, MSMR, TDMR, SMR, IMR, etc. The two or more heads 612, 632 may also include respective write transducers that concurrently write to the disk 610. The write transducers may be configured to write using a HAMR energy source, and may write in various track configurations, such as conventional, SMR, and IMR.

The read/write channels 608 may include analog and digital circuitry such as decoders, timing-recovery units, error correction units, etc. The read/write channel is coupled to the heads 612, 632 via interface circuitry 613 that may include preamplifiers, filters, digital-to-analog converters, analog-to-digital converters, etc. As shown in the figure, the read/write channels 608 are capable of concurrently process one of a plurality of data streams from the multiple heads 612, 632.

In addition to processing user data, the read/write channel 608 reads servo data from servo marks 614 on the magnetic disk 610 via the read/write heads 612, 632. The servo data are sent to one or more servo controllers 616 that use the data to provide position control signals 617 to one or more actuators, as represented by voice coil motors (VCMs) 618. The VCM 618 rotates an arm 620 upon which the read/write heads 612 are mounted in response to the control signals 617. The position control signals 617 may also be sent to microactuators 624 that individually control each of the heads 612, e.g., causing small displacements at each read/write head.

The VCM 618 may be a stacked or split actuator, in which case two VCM parts are configured to independently rotate different arms about a common axis 619. In such a case, other heads (not shown) will access data on the disks simultaneously with that of heads 612, and these other heads may be coupled to circuitry 602 similar to illustrated head 632. In other embodiments, a second actuator, e.g., VCM 628, may independently and simultaneously rotate a second arm 630 about a second axis 629. Corresponding heads 632 and microactuators 634 may be rotated by the VCM 628 and may operate simultaneously with the heads 612 and microactuators 624 under commands from the one or more servo controllers 616.

A BAR calibration module 640 is configured to determine a BAR for each of the heads 612, 632, and any other heads not shown in the figure. The BAR calibration module 640 determines performance data of the two or more actuators 618, 628 that independently move the two or more heads 612, 632 over the one or more disks 610 coupled to a spindle motor (not shown; see spindle motor 104 in FIG. 1). The independent movement of the respective actuators 618, 628 causes coupling that affects tracking of the two or more heads 612, 632. Based on the performance data, bit aspect ratios associated with each of the respective heads 612, 632 are selected that minimize performance impacts due to the coupling. The selected bit-aspect ratios are used for recording user data via the respective heads 612, 632. The BAR calibration module 640 may include instructions provided externally to the apparatus 600, e.g., via a factory test stand configured to act as host 606.

Figure 7:
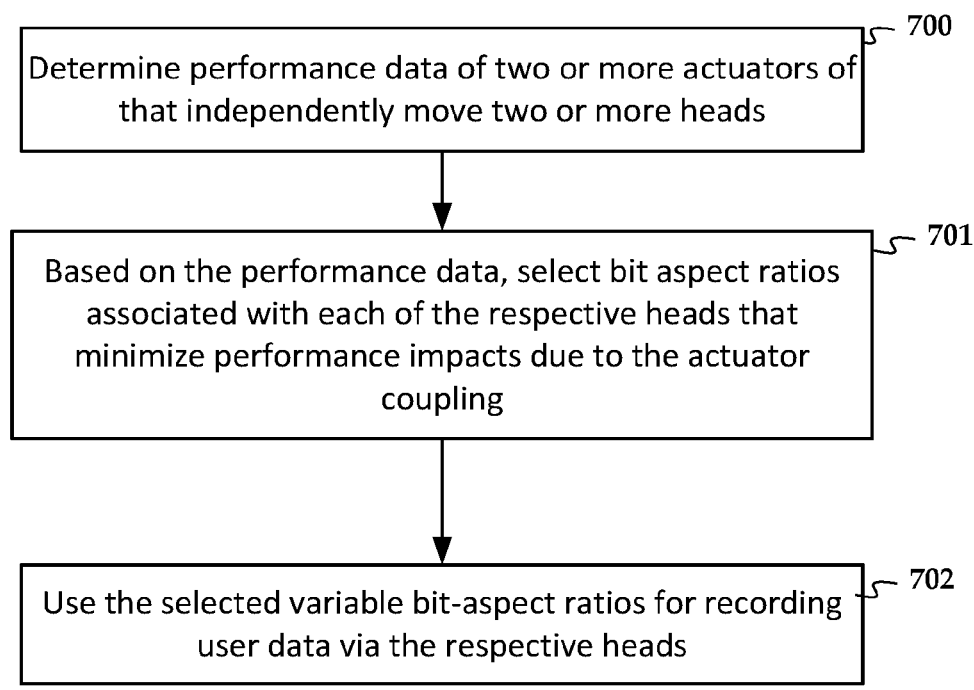
FIG. 7 is a flowchart of a method according to an example embodiment.

In FIG. 7, a flowchart shows a method according to an example embodiment. The method involves determining 700 performance data (e.g., BER, write fault rates, read fault rates, servo tracking data, etc.) of two or more actuators of a storage device that independently move respective two or more heads over one or more disks coupled to a spindle motor. The independent movement of the respective actuators causes coupling that affects tracking of the two or more heads. Based on the performance data, bit aspect ratios associated with each of the respective heads are selected 701 that minimize performance impacts due to the coupling. The selected bit-aspect ratios are used 702 for recording user data via the respective heads.

The various embodiments described above may be implemented using circuitry, firmware, and/or software modules that interact to provide particular results. One of skill in the arts can readily implement such described functionality, either at a modular level or as a whole, using knowledge generally known in the art. For example, the flowcharts and control diagrams illustrated herein may be used to create computer-readable instructions/code for execution by a processor. Such instructions may be stored on a non-transitory computer-readable medium and transferred to the processor for execution as is known in the art. The structures and procedures shown above are only a representative example of embodiments that can be used to provide the functions described hereinabove.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A method, comprising:
   determining performance data of two or more actuators of a storage device that independently move respective two or more heads over one or more disks coupled to a spindle motor, the independent movement of the two or more heads causing coupling therebetween that affects tracking of the two or more heads;
   based on the performance data, selecting bit aspect ratios associated with each of the two or more heads that minimize performance impacts due to the coupling; and
   using the selected bit-aspect ratios for recording user data via the two or more heads.

2. The method of claim 1, wherein different variable bit-aspect ratios are selected and used for the two or more heads.

3. The method of claim 1, wherein the two or more actuators comprise voice coil motors that rotate about a common axis.

4. The method of claim 1, wherein the two or more actuators comprise voice coil motors that rotate about different axes.

5. The method of claim 1, wherein the selected bit aspect ratios comprises track widths that are wider than a first track width of an equivalent device with a single actuator.

6. The method of claim 1, wherein determining the performance data of the two or more actuators comprise determining bit error rate of test tracks written by the two or more heads.

7. The method of claim 1, wherein determining the performance data of the two or more actuators comprise determining servo performance data of the two or more heads.

8. The method of claim 1, wherein determining the performance data of the two or more actuators comprises writing and reading test data via a target one of the heads driven by a target one of the actuators while simultaneously performing random access operations via another one of the actuators.

9. The method of claim 8, wherein the writing and reading of test data comprises writing and reading of sequential data.

10. An apparatus comprising:
    interface circuitry operable to communicate with two or more actuators of the apparatus that independently move respective two or more heads over one or more disks coupled to a spindle motor; and
    a controller coupled to the interface circuitry and configured to:
      determine performance data of the two or more actuators that causes coupling therebetween, the coupling affecting tracking of the two or more heads;
      based on the performance data, select bit aspect ratios associated with each of the two or more heads that minimize performance impacts due to the coupling; and
      use the selected bit-aspect ratios for recording user data via the two or more heads.

11. The apparatus of claim 10, wherein different variable bit-aspect ratios are selected and used for the two or more heads.

12. The apparatus of claim 10, wherein the two or more actuators comprise voice coil motors that rotate about a common axis.

13. The apparatus of claim 10, wherein the two or more actuators comprise voice coil motors that rotate about different axes.

14. The apparatus of claim 10, wherein the selected bit aspect ratios comprises track widths that are wider than a first track width of an equivalent device with a single actuator.

15. The apparatus of claim 10, wherein determining the performance data of the two or more actuators comprise determining bit error rate of test tracks written by the two or more heads.

16. The apparatus of claim 10, wherein determining the performance data of the two or more actuators comprise determining servo performance data of the two or more heads.

17. The apparatus of claim 10, wherein determining the performance data of the two or more actuators comprises writing and reading test data via a target one of the heads driven by a target one of the actuators while simultaneously performing random access operations via another one of the actuators.

18. The apparatus of claim 17, wherein the writing and reading of test data comprises writing and reading of sequential data.

19. An apparatus comprising:
    one or more disks coupled to a spindle motor;
    two or more actuators of the apparatus that independently move respective two or more heads over the one or more disks; and
    a controller coupled to the two or more actuators and configured to:
      determine performance data of the two or more actuators that causes coupling therebetween, the coupling affecting tracking of the two or more heads;
      based on the performance data, select bit aspect ratios associated with each of the two or more heads that minimize performance impacts due to the coupling; and
      use the selected bit-aspect ratios for recording user data via the two or more heads.

20. The apparatus of claim 19, wherein determining the performance data of the two or more actuators comprises writing and reading test data via a target one of the heads driven by a target one of the actuators while simultaneously performing random access operations via another one of the actuators.

* * * * *